United States Patent
Lee et al.

(10) Patent No.: US 8,228,868 B2
(45) Date of Patent: Jul. 24, 2012

(54) METHOD OF SUPPORTING HANDOVER IN A MOBILE COMMUNICATION SYSTEM

(75) Inventors: Young Dae Lee, Gyeonggi-do (KR); Sung Duck Chun, Gyeonggi-do (KR); Myung Cheul Jung, Seoul (KR); Sung Jun Park, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 804 days.

(21) Appl. No.: 12/296,658

(22) PCT Filed: Jun. 15, 2007

(86) PCT No.: PCT/KR2007/002919
§ 371 (c)(1),
(2), (4) Date: Oct. 9, 2008

(87) PCT Pub. No.: WO2007/145486
PCT Pub. Date: Dec. 21, 2007

(65) Prior Publication Data
US 2009/0268687 A1    Oct. 29, 2009

(30) Foreign Application Priority Data
Jun. 16, 2006  (KR) .................. 10-2006-0054467

(51) Int. Cl.
*H04W 4/00*    (2009.01)

(52) U.S. Cl. ................................. 370/331

(58) Field of Classification Search .......... 370/331–334; 455/436–444
See application file for complete search history.

(56) References Cited

U.S. PATENT DOCUMENTS

| | | | |
|---|---|---|---|
| 6,400,951 B1 * | 6/2002 | Vaara | 455/436 |
| 2005/0288026 A1 | 12/2005 | Byun et al. | |
| 2006/0109817 A1 * | 5/2006 | Ramanna et al. | 370/331 |
| 2006/0120327 A1 * | 6/2006 | Suh | 370/331 |
| 2008/0268907 A1 * | 10/2008 | Senarath et al. | 455/561 |

FOREIGN PATENT DOCUMENTS

| | | |
|---|---|---|
| EP | 1675426 A2 | 6/2006 |
| EP | 1684538 A1 | 7/2006 |

* cited by examiner

*Primary Examiner* — Charles C Jiang
(74) *Attorney, Agent, or Firm* — Lee, Hong, Degerman, Kang & Waimey

(57) ABSTRACT

A method of supporting handover at a user equipment in a mobile communication system is disclosed according to the present invention. The method comprises receiving, from a source network node, first identification information identifying at least one data block transferred from the source network node to a target network node during handover, transmitting, to a target network node, second identification information identifying at least one data block to be received from the target network node during the handover, and receiving a data block from the target network node, the data block being transmitted by the target network node based on the second identification information.

19 Claims, 9 Drawing Sheets

METHOD OF SUPPORTING HANDOVER IN A MOBILE COMMUNICATION SYSTEM

CROSS-REFERENCE TO RELATED APPLICATIONS

This application is a 371 U.S. national stage application of International Application No. PCT/KR2007/002919, filed on Jun. 15, 2007, which claims priority to Korean Application Serial No. 10-2006-0054467, filed on Jun. 16, 2006.

TECHNICAL FIELD

The present invention relates to a mobile communication system, and more particularly, to a method of performing handover in a mobile communication system.

BACKGROUND ART

FIG. 1 is a diagram illustrating a problem that may occur when handover is performed in a mobile communication system according to the related art.

In a mobile communication system, handover means a procedure that a user equipment (UE) which is connected with a source base station to perform communication is disconnected from the source base station as the user equipment moves and establishes a new connection with a target base station to which the user equipment moves. The user equipment can receive seamless services from a network during movement through the handover procedure.

If the handover procedure is initiated, the source base station needs to transfer some data blocks stored therein to the target base station, wherein the data blocks should be transmitted to the user equipment which performs handover. The target base station transmits the data blocks transferred from the source base station to the user equipment after completing the handover.

In FIG. 1, a data block 'S' means a service data unit (SDU), and a data block 'P' means a protocol data unit (PDU). Also, '60' in 'S:60' or 'P:60' means a sequence number (SN) of the SDU or the PDU. A specific protocol layer of the source base station, for example, a radio link control (RLC) layer receives service data units (SDUs) delivered from a higher network node or a higher layer to generate protocol data units (PDUs), and transmits the generated PDUs to the user equipment.

If handover is performed from the source base station to the target base station due to movement of the user equipment, the source base station should transfer, to the target base station, data blocks which are not sure that the user equipment has successfully received them and all data bocks of the source base station thereafter. In FIG. 1, the source base station transmits the data blocks up to 'S:65' or 'P:1006' to the user equipment. At this time, with respect to PDU of 'P:1002,' it is supposed that ACK has not been received from the user equipment or NACK has been received from the user equipment. In this case, if handover is initiated, for example, if the source base station transmits a handover command (HO command) message to the user equipment, the PDUs from 'P:1007' are not transmitted to the user equipment.

Since the source base station has failed to receive ACK from the user equipment or has received NACK from the user equipment with respect to PDU of 'P:1002,' the source base station or the target base station cannot identify whether the user equipment has successfully received 'S:61' and 'S:62' SDUs included in the PDU of 'P:1002.' Since the source base station cannot identify information of the data blocks which the user has successfully received, the source base station transmits, to the target base station, the data blocks which are determined that the user equipment has failed to successfully receive them, i.e., all data blocks from 'S:61.' The target base station transmits, to the user equipment, the data blocks from 'S:61,' which are received from the source base station, after handover ends.

In this case, for example, if the source base station has failed to receive ACK or has received it as NACK even though the user equipment has transmitted ACK to the source base station after successfully receiving PDU of 'P:1002,' transfer of the data blocks from the source base station to the target base station and transmission of the data blocks from the target base station to the user equipment after end of handover may correspond to unnecessary transmission. For this reason, problems occur in that such unnecessary transmission of the data blocks increases network congestion and deteriorates efficiency of radio resources use.

DISCLOSURE OF THE INVENTION

Accordingly, the present invention is directed to a method of supporting handover in a mobile communication system, which substantially obviates one or more problems due to limitations and disadvantages of the related art.

An object of the present invention is to provide a method of minimizing user traffic unnecessarily transmitted during a handover procedure.

Another object of the present invention is to provide a method of reducing network congestion in a mobile communication system.

Other object of the present invention is to provide a method of preventing redundant user traffic from being performed by a user equipment.

To achieve these objects and other advantages and in accordance with the purpose of the invention, as embodied and broadly described herein, a method of supporting handover at a user equipment in a mobile communication system comprises receiving, from a source network node, first identification information identifying at least one data block transferred from the source network node to a target network node during handover, transmitting, to a target network node, second identification information identifying at least one data block to be received from the target network node during the handover, and receiving a data block from the target network node, the data block being transmitted by the target network node based on the second identification information.

In another aspect of the present invention, a method of supporting handover at a target network node in a mobile communication system comprises receiving, from a source network node, at least one data block during handover, receiving, from the user equipment, identification information identifying at least one data block to be transmitted to the user equipment during the handover, and transmitting a data block to the user equipment, the data block being selected based on the identification information.

BEST MODE FOR CARRYING OUT THE INVENTION

Figure 1:
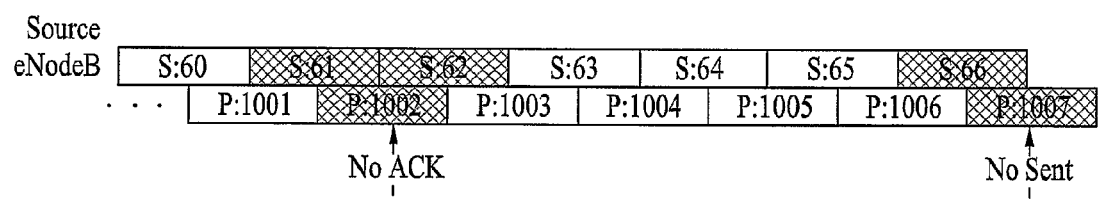
FIG. 1 is a diagram illustrating a problem that may occur when handover is performed in a mobile communication system according to the related art.
Figure 2:
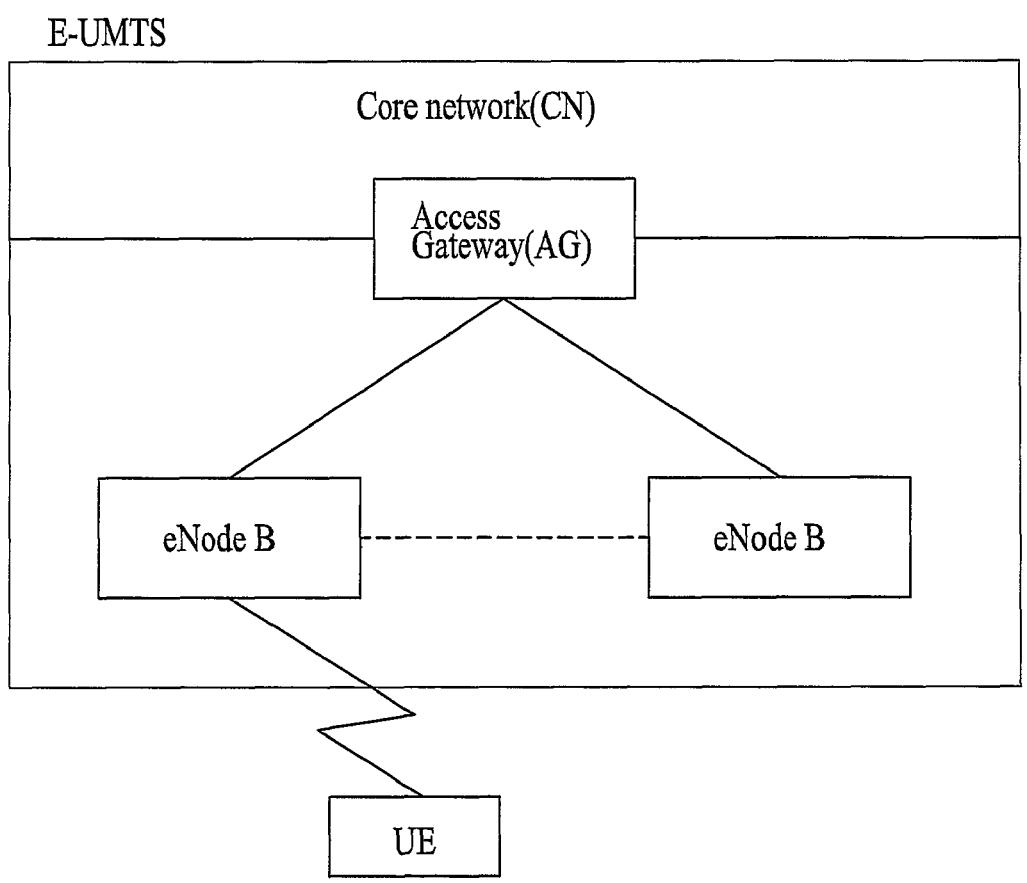
FIG. 2 is a block diagram of a network structure of an E-UMTS (Evolved-Universal Mobile Telecommunications System) to which technical features of the present invention are applied.

FIG. 2 is a block diagram of a network structure of an E-UMTS (Evolved-Universal Mobile Telecommunications System) to which technical features of the present invention are applied. An E-UMTS is a system evolving from the conventional UMTS and its basic standardization is currently handled by the 3GPP ($3^{rd}$ Generation Partnership Project). The E-UMTS can also be called an LTE (Long Term Evolution) system. Release 7 and Release 8 of 3GPP technical specifications ($3^{rd}$ Generation Partnership Project; Technical Specification Group Radio Access Network) can be referred to obtain detailed information about the UMTS and E-UMTS, Referring to FIG. 2, an E-UMTS network includes a user equipment (hereinafter abbreviated 'UE'), a network node (hereinafter named 'eNode B' or 'eNB') and an access gateway hereinafter abbreviated 'aGW') connected to an external network by being located at an end of the E-UMTS network. The aGW may be classified into a part for handling user traffic and a part for handling control traffic. A first aGW for processing new user traffic may communicate with a second AG for processing control traffic via a new interface. A eNode-B may include at least one cell. A first interface for transmitting user traffic or a second interface for transmitting control-traffic may be located between several eNode-Bs. The CN may include the aGW and a plurality of nodes for registering users of User Equipments (UEs). If required, another interface for discriminating between the E-UTRAN and the CN may also be used for the LTE network. The aGW manages mobility of a UE by unit of a tracking area (TA). A TA comprises a plurality of cells. When a UE moves into a TA from another TA, the UE informs the aGW of the change of the TAs. The eNode B includes at least one cell.

Figure 3:
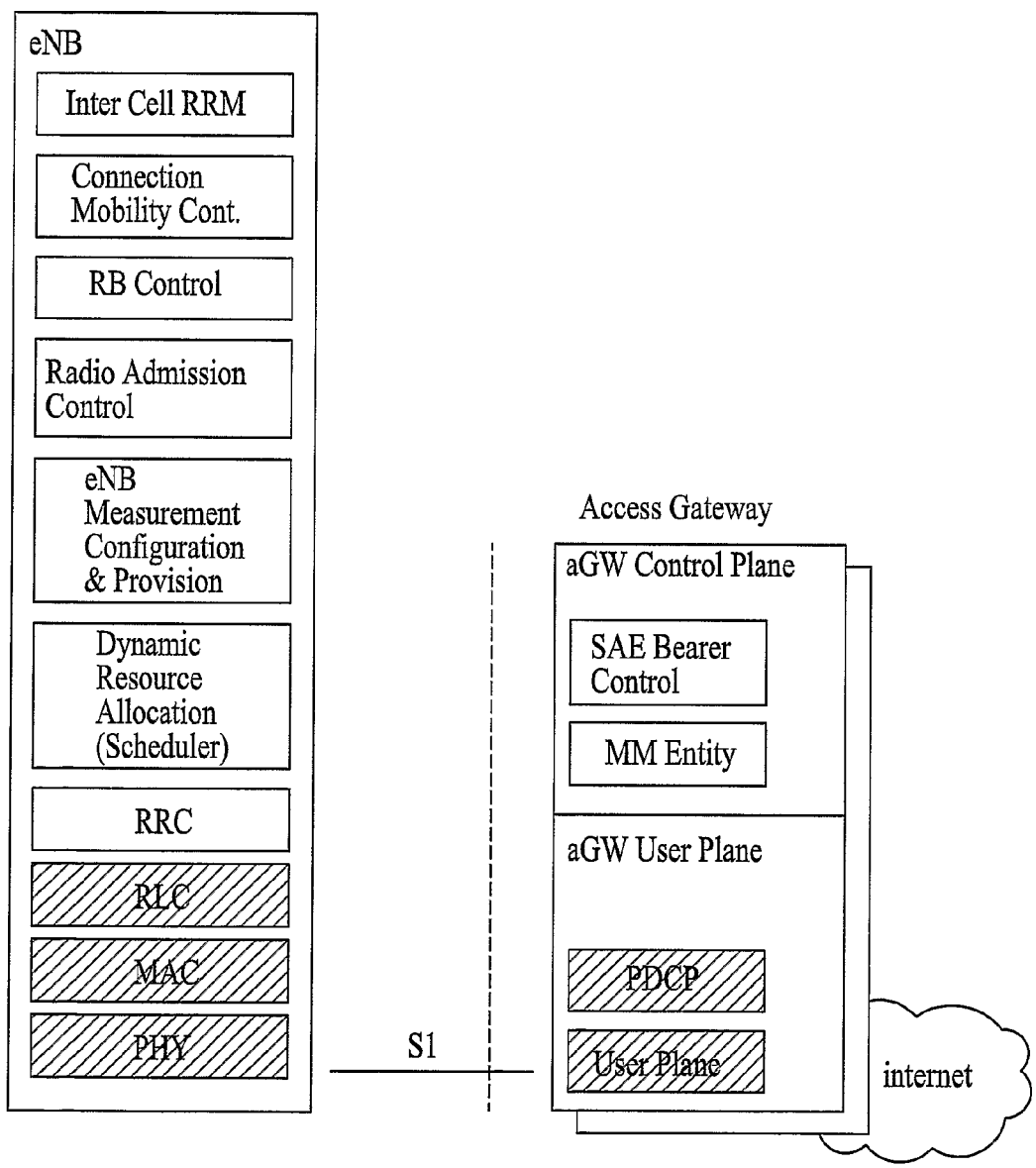
FIG. 3 is a schematic diagram illustrating protocol architecture of an E-UTRAN.

FIG. 3 is a schematic diagram illustrating protocol architecture of an E-UTRAN. In FIG. 2, the hatching part represents functional entities of a control plane and the non-hatching part represents functional entities of a user plane.

Layers of a radio interface protocol between a UE and a network can be classified into a first layer L1, a second layer L2 and a third layer L3 based on three lower layers of OSI (open system interconnection) reference model widely known in communication systems. A physical layer belonging to the first layer L1 provides an information transfer service using a physical channel. A radio resource control (hereinafter abbreviated 'RRC') located at the third layer plays a role in controlling radio resources between the UE and the network. For this, the RRC layer enables RRC messages to be exchanged between the UE and the network. The RRC layer can be distributively located at network nodes including an eNode B, an AG and the like or at either the Node B or the AG.

Figure 4A:
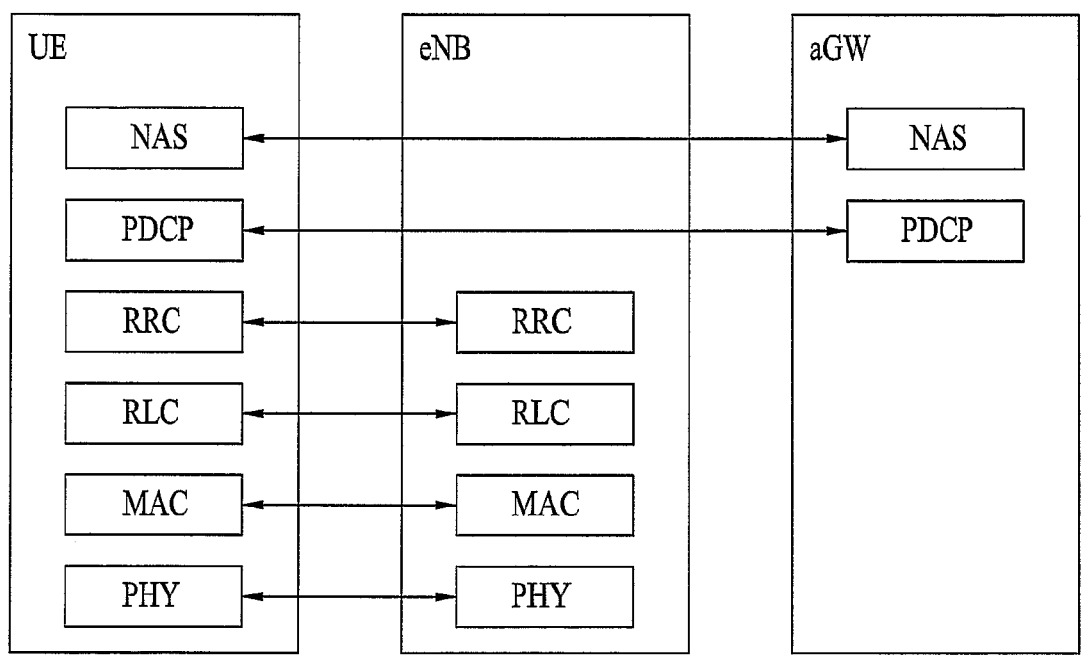
FIGS. 4A and 4B are architectural diagrams of a control plane and a user plane, respectively of a radio interface protocol between UE (user equipment) and E-UTRAN (UMTS terrestrial radio access network)
Figure 4B:
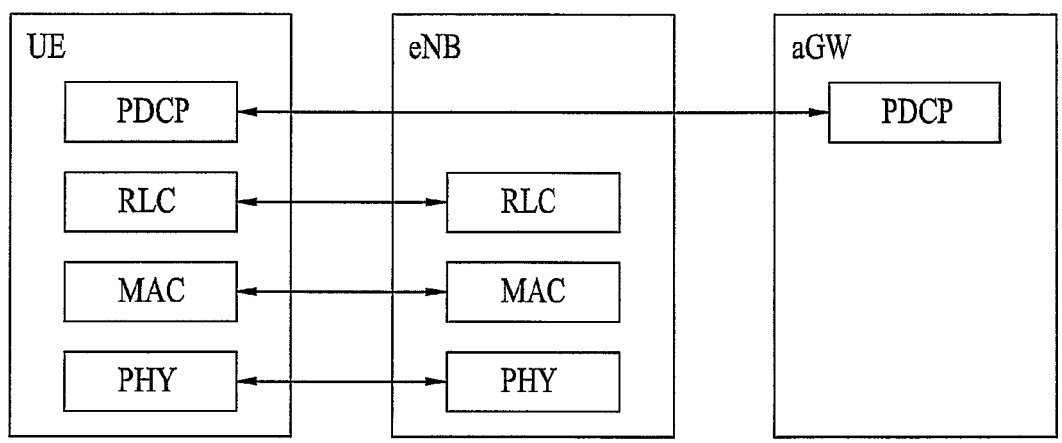

FIGS. 4A and 4B are architectural diagrams of a control plane and a user plane, respectively of a radio interface protocol between UE (user equipment) and UTRAN (UMTS terrestrial radio access network) based on the 3GPP radio access network standard. Referring to FIG. 4A, a radio interface protocol vertically includes a physical layer, a data link layer, and a network layer and horizontally includes a user plane for data information transfer and a control plane for signaling transfer. The protocol layers in FIG. 4A can be classified into L1 (first layer), L2 (second layer), and L3 (third layer) based on three lower layers of the open system interconnection (OSI) standard model widely known in the communications systems.

The respective layers of a radio protocol control plane shown in FIG. 4A and a radio protocol user plane shown in FIG. 4B are explained as follows.

First of all, the physical layer as the first layer provides information transfer service to an upper layer using physical channels. The physical layer SHY) is connected to a medium access control (hereinafter abbreviated 'MAC') layer above the physical layer via transport channels. Data are transferred between the medium access control layer and the physical layer via the transport channels. Moreover, data is transferred between different physical layers, and more particularly, between one physical layer of a transmitting side and the other physical layer of a receiving side via the physical channels. A downlink physical channel of the E-UMTS is modulated according to an orthogonal frequency division multiplexing (OFDM) scheme and time and frequency are used as radio resources.

The medium access control hereinafter abbreviated 'MAC') layer of the second layer provides a service to a radio link control (hereinafter abbreviated RLC) layer above the MAC layer via logical channels. The RLC layer of the second layer supports reliable data transfer. In order to effectively transmit IP packets (e.g., IPv4 or IPv6) within a radio-communication period having a narrow bandwidth, a PDCP layer of the second layer (L2) performs header compression to reduce the size of a relatively-large IP packet header containing unnecessary control information.

A radio resource control (hereinafter abbreviated 'RRC') layer located on a lowest part of the third layer is defined in the control plane only and is associated with configuration, reconfiguration and release of radio bearers (hereinafter abbreviated 'RBs') to be in charge of controlling the logical, transport and physical channels. In this case, the RB means a service provided by the second layer for the data transfer between the UE and the UTRAN.

As a downlink transport channel carrying data to UEs from the network, there is a broadcast channel (BCH) carrying system information and a downlink shared channel (SCH) carrying user traffic or control messages. The traffic or control messages of a downlink multicast or broadcast service can be transmitted via the downlink SCH or an additional downlink multicast channel (MCH). Meanwhile, as an uplink transport channel carrying data to the network from UEs, there is a random access channel (RACH) carrying an initial control message and a uplink shared channel (UL-SCH) carrying user traffic or control message.

In the E-UMTS system, an OFDM is used on the downlink and a single carrier frequency division multiple access (SC-FDMA) on the uplink. The OFDM scheme using multiple carriers allocates resources by unit of multiple sub-carriers including a group of carriers and utilizes an orthogonal frequency division multiple access (OFDMA) as an access scheme.

A physical layer of an OFDM or OFDMA scheme divides active carriers into a plurality of groups and transmits each group to a different receiving side. Radio resource allocated to each UE which is defined as a time-frequency region on a two-dimensional sphere comprises continuous sub-carriers on a frequency axis and symbols on a time axis. A time-frequency region in the OFDM or OFDMA scheme is a rectangular form sectioned by time and frequency coordinates. One or more time-frequency region can be allocated to an uplink for a UE and an eNB can transmit one or more time-frequency region to a UE. In order to define a time-frequency region on the two-dimensional sphere, the number of OFDM symbols and sub-carriers starting from a point having an offset from a reference point should be given.

The E-UMTS uses 10 ms radio frame comprising 20 sub-frames. Namely, a sub-frame is 0.5 ms length. A resource block comprises one sub-frame and twelve sub-carriers, each of which is 15 kHz. One sub-frame comprises a plurality of OFDM symbols and a part of the plurality of OFDM symbols can be used for L1/2 control information.

Figure 5:
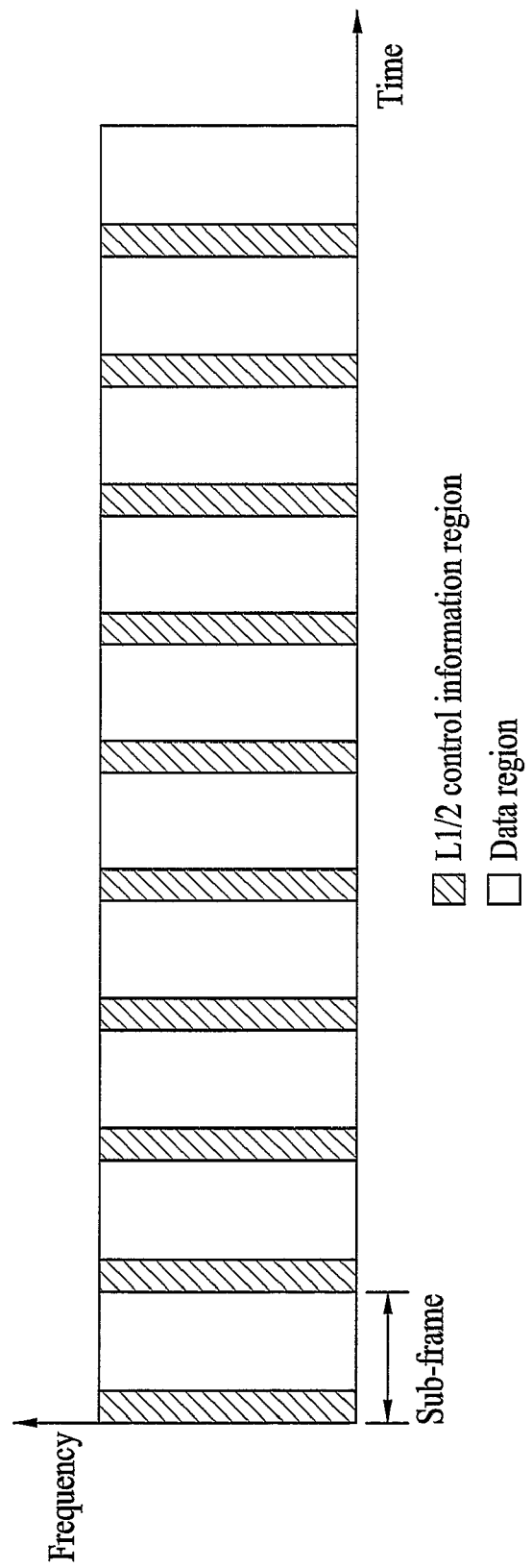
FIG. 5 is a diagram illustrating a structure of physical channels in an E-UMTS system.

FIG. 5 is a diagram illustrating a structure of physical channels in the E-UMTS. In FIG. 5, a sub-frame comprises a L1/2 control information transmission region (the hatching part) and a data transmission region (the non-hatching part).

Figure 6:
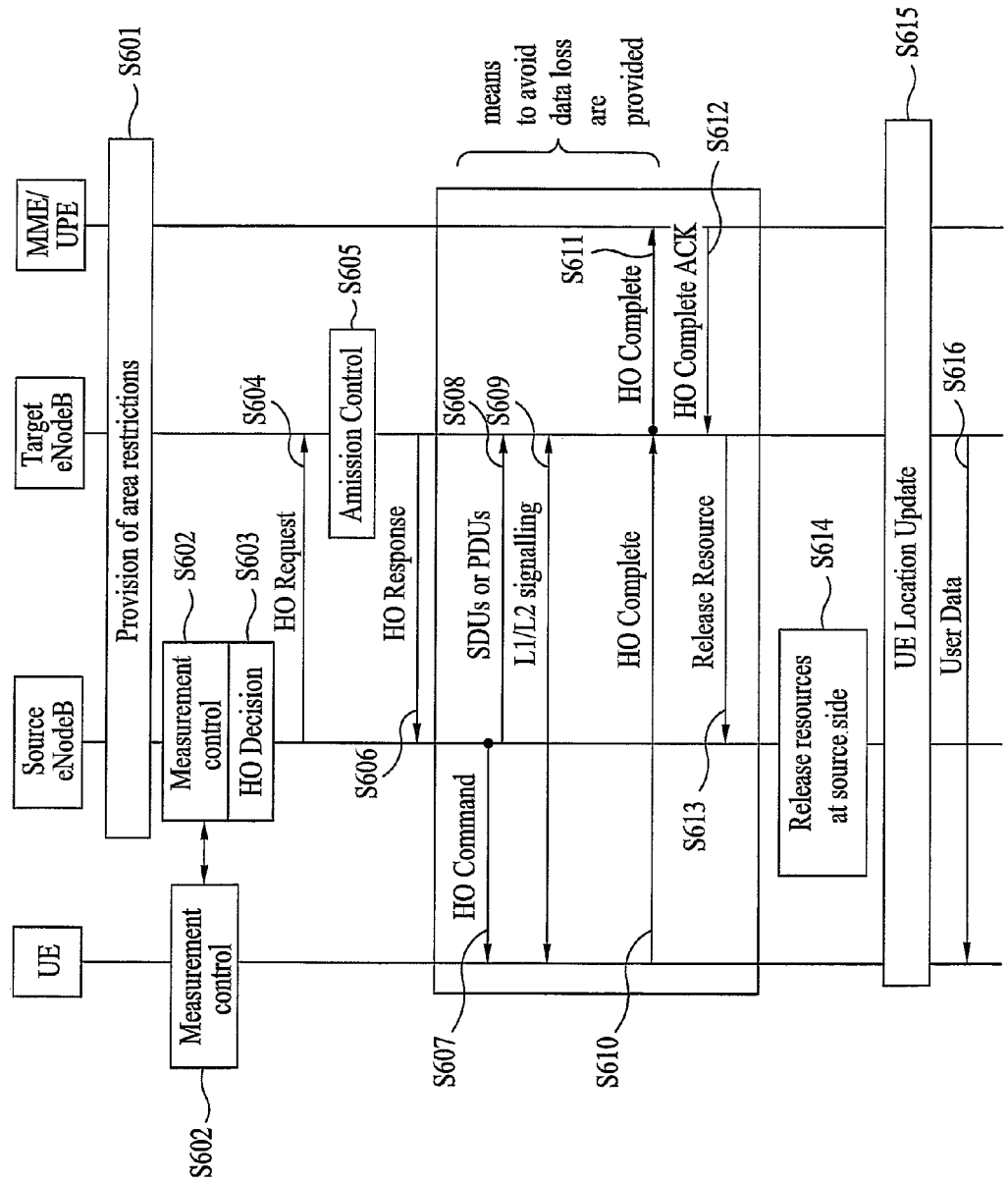
FIG. 6 is a flow chart of a procedure of performing handover in an E-UMTS system, which is a kind of a mobile communication system, in accordance with one embodiment of the present invention.

FIG. 6 is a flow chart illustrating a procedure of performing handover in an E-UMTS system, which is a kind of a mobile communication system, in accordance with one embodiment of the present invention.

Referring to FIG. 6, network nodes shares UE context which is information related to a specific user equipment [S601]. The UE context includes Provision of Area Restriction information. The user equipment performs a measurement procedure either periodically or if a predetermined event occurs, and informs a source base station (or source e-Node B) of the measurement result [S602]. The source base station receives measurement information of neighboring base stations from the user equipment and determines handover to a specific neighboring base station (or cell), i.e., a target base station (or target e-Node B) if the received measurement information satisfies a certain condition [S603].

The source base station transmits a handover request (HO Request) message to the target base station (target eNodeB) [S604]. The target base station determines whether to allow a handover request considering its wire or wireless resources [S605]. The target base station transmits a handover response (HO Response) message to the source base station [S606]. The source base station transmits a handover command (HO command) to the user equipment [S607]. The source base station transmits data blocks (SDUs or PDUs), which are to be transmitted to the user equipment, to the target base station before or after transmitting the handover command message to the user equipment [S608]. The handover command message includes information (for example, identification information of at least one data block among the data blocks) related to the data blocks transferred from the source base station to the target base station.

The user equipment which has received the handover command message performs an L1/L2 signaling process for establishing a connection with the target base station [S609]. The L1/L2 signaling procedure includes a synchronization acquisition procedure. If the L1/L2 signaling procedure ends, the user equipment transmits a handover complete (HO complete) message to the target base station [S610]. The handover complete message includes information related to data blocks (SDUs or PDUs) which the user equipment should receive from the target base station.

The target base station transmits the handover complete message to MME/UPE [S611]. The MME/UPE transmits a handover complete ACK (HO complete ACK) message to the target base station [S612]. The target base station transmits a resource release message to the source base station [S613]. The source base station which has received the resource release message releases all the resources for connection with the user equipment [S614]. If the handover procedure ends, a location update procedure of the user equipment is performed [S615]. The target base station transmits user data to the user equipment [S616]. In this case, the target base station determines data blocks, which are to be transmitted to the user equipment, in accordance with the information related to the data blocks received from the user equipment.

Figure 7:
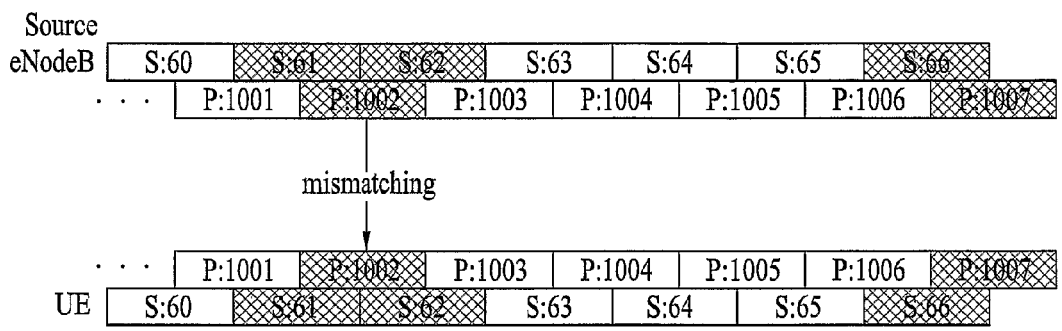
FIG. 7 illustrates one embodiment of the present invention.

FIG. 7 is a diagram illustrating one embodiment of the present invention.

In FIG. 7, it is supposed that the user equipment has successfully received data blocks 'P:1001'~'P:1006' transmitted from the source base station. However, the source base station has failed to receive ACK from the user equipment or has received NACK from the user equipment due to some circumstances with respect to the data block 'P:1002.' Accordingly, the source base station determines that the user equipment has failed to successfully receive the data block 'P:1002.' Also, the source base station determines that the user equipment has failed to receive successfully 'S:61' and 'S:62' related to the data block 'P:1002.'

If a handover procedure is initiated due to movement of the user equipment, the source base station transfers, to the target base station, the data block 'S:61' or all the data blocks from the data block 'P:1002,' among the data blocks which are to be transmitted to the user equipment (see S608 of FIG. 6).

The source base station transmits, to the user equipment, information related to at least one data block transferred to the target base station. Preferably, the information related to at least one data block is identification information of the at least one data block. For example, in example of FIG. 7, the source base station can transmit, to the user equipment, a sequence number of the first data block 'S:61' or the data block 'P:1002' among the data blocks transferred to the target base station. The information related to the at least one data block may be transmitted by being included in the handover command message.

The user equipment which has received the handover command message compares the receiving status of the data block received from the source base station with the information related to the data blocks transferred from the source base station to the target base station. In other words, the user equipment checks whether the data blocks transferred from the source base station to the target base station include the data block successfully received from the source base station to the user equipment. In example of FIG. 7, the user equipment successfully receives the data blocks from 'S:61' to 'S:65' or from P:1003' to 'P:1006' among the data blocks transferred from the source base station to the target base station.

Accordingly, since the user equipment does not need to receive the data blocks from 'S:61' to 'S:65' or from P:1003' to 'P:1006' from the target base station again, the user equipment transmits, to the target base station, the information related to the data blocks to be received from the target base station. In other words, the user equipment transmits, to the target base station, either the fact that data blocks to be received after handover are arranged in order different from that of data blocks informed through the handover command message or identification information of at least one data block which the user equipment wishes to receive, for example, a sequence number. Preferably, the information is transmitted by being included in the handover complete message.

For example, in example of FIG. 7, since the user equipment successfully receives the data blocks from 'S:61' to 'S:65,' the user equipment only needs to receive traffic of the data block 'S:66.' Accordingly, the user equipment informs through the handover complete message that the data block to be received from the target base station is the data block 'S:66.' The target base station which has received the handover complete message from the user equipment only needs to transmit data from the data block 'S:66' requested from the user equipment. The target base station discards the other data blocks from 'S:61' to 'S:65.'

Figure 8:
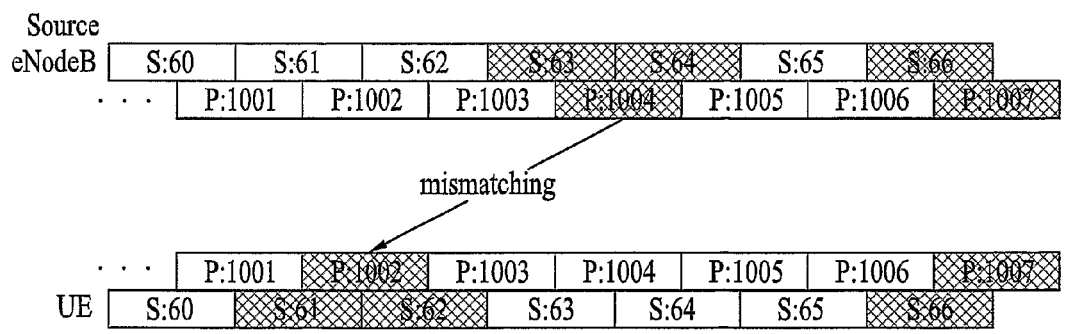
FIG. 8 illustrates another embodiment of the present invention.

FIG. 8 is a diagram illustrating another embodiment of the present invention.

In the embodiment of FIG. 8, it is supposed that the source base station has failed to receive ACK from the user equipment or has received NACK from the user equipment with respect to the data block 'P:1004.' Also, in the embodiment of FIG. 8, although the user equipment has transmitted NACK to the source base station as the user equipment has failed to successfully receive the data block 'P:1002,' the source base station receives NACK as ACK due to error in the transmission procedure.

The source base station identifies that the user equipment has successfully received the data block 'P:1002' but has failed to successfully receive the data block 'P:1004.' However, the user equipment has actually failed to receive the data block 'P:1002.' At this time, if a handover procedure is initiated due to movement of the user equipment, the source base station transfers, to the target base station, the data blocks to be transmitted to the user equipment, starting from the data block 'S:63.' Accordingly, the user equipment fails to receive the data blocks 'S:61' and 'S:62,' which have not been successfully received from the source base station 608, from the target base station even after handover.

To solve such a problem, the source base station transmits the handover command message to the user equipment, wherein the handover command message includes information related to the data blocks transferred from the source base station to the target base station. For example, the handover command message transmitted to the user equipment includes a sequence number of the data block 'S:63' which has the smallest sequence number among the data blocks transferred from the source base station to the target base station.

The user equipment can identify that the data block which the user equipment should receive, i.e., the data block 'S:61' among the data blocks transferred from the source base station to the target base station has been omitted from the handover command message. The user equipment transmits, to the target base station, information related to at least one data block to be received from the target base station. The information may be transmitted by being included in the handover complete message.

In the example of FIG. 8, the user equipment can inform the target base station that the user equipment wishes to first receive the data block 'S:61' by including the sequence number of the data block 'S:61' in the handover complete message. The target base station starts to first transmit, to the user equipment, the data block which the user equipment wishes. At this time, if the target base station does not have the data block which the user equipment wishes, the target base station may request re-transmission of the corresponding data block from AG or MME/UPE which is a higher network node.

Hereinafter, information (hereinafter, 'first information'), which is related to at least one data block transferred from the source base station to the target base station during handover and is transmitted from the source base station to the user equipment, and information (hereinafter, 'second information'), which is related to at least one data block which the user equipment wishes to receive from the target base station after handover, will be described in detail. As described above, the first information may be transmitted by being included in the handover command message, and the second information may be transmitted by being included in the handover complete message.

The first information may include the sequence number of the first data block which has been transmitted from the source base station to the user equipment but a response thereof indicating successful reception, i.e., ACK has not been received from the user equipment. In the example of FIG. 7, since the data block 'P:1002' is the first data block which the source base station has failed to receive ACK from the user equipment, the sequence number '61' or '1002' of the data block 'S:61' or 'P:1002' may be provided as the first information.

The first information may include sequence numbers of all data blocks which have been transmitted from the source base station to the user equipment but a response thereof indicating successful reception, i.e., ACK has not been received from the user equipment. For example, if the source base station has transmitted the data blocks 'S:61'~'S:70' and but has failed to receive ACK or has received NACK with respect to the data blocks 'S:63', 'S:65,' and 'S:68,' the source base station can transmit the handover command message to the user equipment, wherein the handover command message includes sequence numbers 63, 65 and 68 of the data blocks. The first information may be provided in various formats such as a bitmap format.

The second information ray include the sequence number of the first data block which the user equipment wishes to receive from the target base station after handover. In the example of FIG. 7, since the data block 'P:1007' is the first data block which the user equipment has failed to successfully receive, the sequence number '66' or '1007' of the data block 'S:66' or 'P:1007' may be provided as the second information. Also, the second information may include sequence numbers of all data blocks which the user equipment has failed to successfully receive from the source base station before handover. For example, if the source base station has transmitted the data blocks 'S:61'~'S:70' to the user equipment but the user equipment has failed to successfully receive the data blocks 'S:65', 'S:67,' and 'S:68,' the user equipment can transmit the handover complete message to the target base station, wherein the handover complete message includes sequence numbers 65, 67 and 68 of the data blocks as the second information.

As another example, the second information may include sequence numbers of data blocks to be received from the target base station to the user equipment after handover among data blocks having sequence numbers included in the first information which the user equipment has received from the source base station. For example, if the handover command message includes the sequence numbers of the data blocks 'S:63', 'S:65, and 'S:68' as the first information, the user equipment determines that the data blocks S:65' and 'S:68' will be retransmitted from the target base station, and transmits the handover complete message to the target base station, wherein the handover complete message includes the sequence number of the data block 'S:67' as the second information. The second information may be provided in various formats such as a bitmap format.

Figure 9:
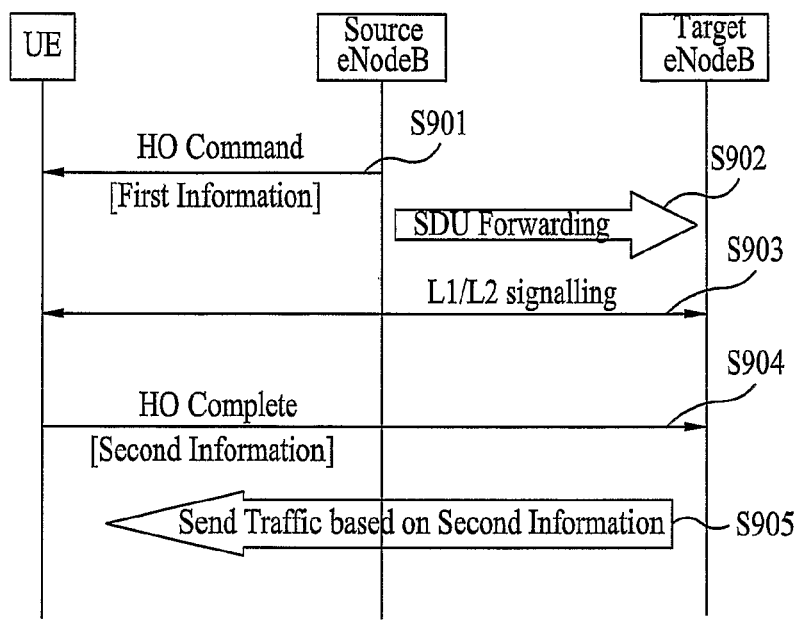
FIG. 9 is a flow chart illustrating a procedure of performing handover according to one embodiment of the present invention.

FIG. 9 is a flow chart illustrating a procedure of performing handover according to one embodiment of the present invention. The embodiment of FIG. 9 is used for downstream traffic transmission.

The source base station transmits a handover command (HO Command) message to the user equipment after determining handover [S901]. The handover command message includes first information. The first information is the same as described above. After transmitting the handover command message, the source base station transmits the data blocks to the target base station in accordance with the second information [S902].

After receiving the handover command message from the source base station, the user equipment ends connection with the source base station and sets connection with the target base station through L1/L2 signaling [S903]. After setting connection with the target base station, the user equipment transmits a handover complete (HO Complete) message to the target base station [S904]. The handover complete message includes the second information. The second information is the same as described above. The target base station identifies information related to the data blocks to be received by the user equipment, from the second information included in the handover complete message, and transmits the data blocks to the user equipment in accordance with the identified information [S905].

Figure 10:
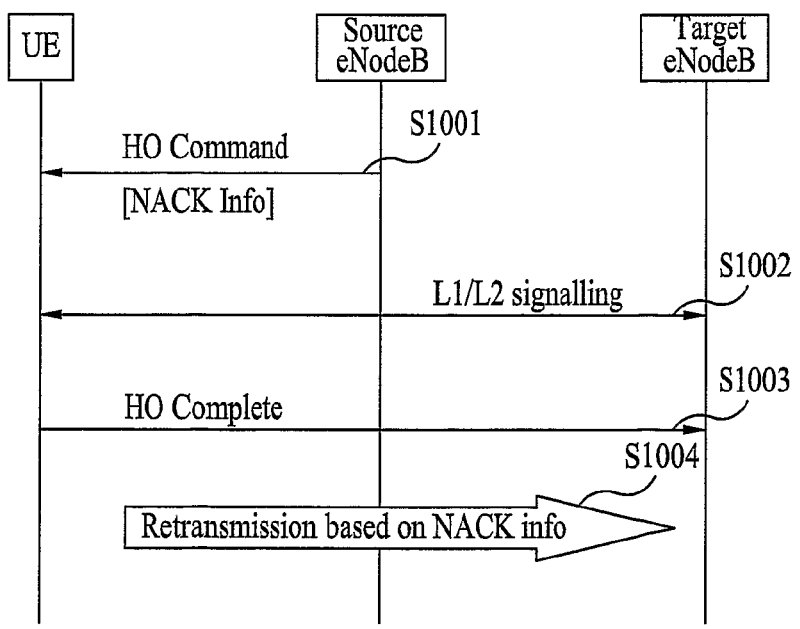
FIG. 10 is a flow chart illustrating a procedure of performing handover according to another embodiment of the present invention.

FIG. 10 is a flow chart illustrating a procedure of performing handover according to another embodiment of the present invention. The embodiment of FIG. 10 is used for upstream traffic transmission.

Referring to FIG. 10, in case of upstream traffic information, the source base station transmits identification information (NACK Info) of at least one data block which has not been successfully received from the user equipment [S1001]. The identification information can be included in a handover command (HO Command) message to be transmitted to the user equipment [S1001]. The identification information may include at least one sequence number of the at least one data block. For example, the identification information may include a sequence number of the first data block among the at least one data block or every sequence number of the at least one data block. The user equipment receives the handover command message from the source base station and identifies at least one data block to be transmitted to the target base station. The user equipment performs L1/L2 signaling to set connection with the target base station [S1002]. The user equipment transmits the handover command message to the target base station, wherein the handover command message may include information of data blocks which the target base station will receive [S1003]. The user equipment transmits the data blocks to the target base station in accordance with the information included in the handover complete message. [S1004].

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention is applicable to such a wireless communication system as a wireless internet, a mobile communication system and the like.

The invention claimed is:

1. A method of supporting handover at a user equipment in a mobile communication system, the method comprising:
   receiving, from a source network node, first identification information identifying at least one first data block transferred from the source network node to a target network node during a handover;
   transmitting, to the target network node, second identification information identifying at least one second data block to be received from the target network node during the handover;
   receiving the at least one second data block from the target network node based on the second identification information;
   requesting an upper network node to transfer a data block not included in the at least one first data block received from the source network node; and
   receiving the data block from the upper network node,
   wherein the first identification information includes a sequence number of a data block of the at least one first data block for which the source network node did not receive an acknowledgement (ACK) from the user equipment.

2. The method of claim 1, wherein the first identification information further includes a sequence number of a first data block among the at least one first data block.

3. The method of claim 2, wherein the second identification information includes a sequence number for a first data block of the at least one second data block.

4. The method of claim 1, wherein the second identification information includes a sequence number of a first data block among the at least one second data block.

5. The method of claim 1, wherein the first identification information further includes a sequence number of each data block of the at least one first data block.

6. The method of claim 5, wherein the second identification information includes a sequence number of each data block of the at least one first data block that the user equipment failed to receive from the source network node.

7. The method of claim 1, further comprising:
   receiving the first identification information in a handover command message.

8. The method of claim 1, further comprising:
   receiving the second identification information in a handover complete message.

9. The method of claim 1, wherein the at least one second data block is a service data unit (SDU) of a protocol layer at the user equipment.

10. The method of claim 9, wherein the protocol layer is a radio link control (RLC) layer.

11. The method of claim 1, wherein the at least one second data block is a protocol data unit (PDU) of a protocol layer at the user equipment.

12. The method of claim 11, wherein the protocol layer is a radio link control (RLC) layer.

13. The method of claim 1, wherein the upper network node is an access gateway (AG) or a Mobility Management Entity (MME)/User Plane Entity (UPE).

14. A method of supporting a handover at a target network node in a mobile communication system, the method comprising:

receiving, from a source network node, at least one first data block during a handover;

receiving, from a user equipment, identification information identifying at least one second data block to be transmitted to the user equipment during the handover;

transmitting the at least one second block to the user equipment based on the identification information;

requesting an upper network node to transfer a data block not included in the at least one first data block received from the source network node; and receiving the data block from the upper network node, wherein the identification information includes a sequence number of a data block of the at least one first data block that the user equipment failed to receive from the source network node.

15. The method of claim 14, wherein the identification information is received in a handover complete message.

16. The method of claim 14, wherein the at least one second block is a service data unit (SDU) of a protocol layer at the target network node.

17. The method of claim 16, wherein the protocol layer is a radio link control (RLC) layer.

18. The method of claim 14, wherein the at least one second block is a protocol data unit (PDU) of a protocol layer at the target network node.

19. The method of claim 18, wherein the protocol layer is a radio link control (RLC) layer.

* * * * *